(12) United States Patent
Kieselbach et al.

(10) Patent No.: US 9,037,525 B2
(45) Date of Patent: May 19, 2015

(54) CORRELATING DATA FROM MULTIPLE BUSINESS PROCESSES TO A BUSINESS PROCESS SCENARIO

(71) Applicants: Oliver Kieselbach, Bielefeld (DE); Harshavardhan Jegadeesan, Bangalore (IN); Ramana Mohanbabu, Bangalore (IN)

(72) Inventors: Oliver Kieselbach, Bielefeld (DE); Harshavardhan Jegadeesan, Bangalore (IN); Ramana Mohanbabu, Bangalore (IN)

(73) Assignee: SAP SE, Walldorf (DE)

( * ) Notice: Subject to any disclaimer, the term of this patent is extended or adjusted under 35 U.S.C. 154(b) by 278 days.

(21) Appl. No.: 13/782,493

(22) Filed: Mar. 1, 2013

(65) Prior Publication Data

US 2014/0250040 A1    Sep. 4, 2014

(51) Int. Cl.
*G06N 5/02* (2006.01)
*G06Q 10/06* (2012.01)

(52) U.S. Cl.
CPC . *G06N 5/02* (2013.01); *G06Q 10/06* (2013.01)

(58) Field of Classification Search
None
See application file for complete search history.

(56) References Cited

U.S. PATENT DOCUMENTS

| 2012/0016999 | A1 | 1/2012 | Kieselbach et al. |
| 2012/0054286 | A1 | 3/2012 | Kieselbach |
| 2012/0054301 | A1 | 3/2012 | Kieselbach |
| 2012/0054335 | A1 | 3/2012 | Kieselbach |
| 2012/0054662 | A1 | 3/2012 | Kieselbach |
| 2012/0078802 | A1 | 3/2012 | Kieselbach |

OTHER PUBLICATIONS

IBM, IBM VisualAge® for Java™, Version 3.5: Access Builder and Connector for SAP R/3, User's Manual, 2000, pp. 1-185.*
U.S. Appl. No. 13/611,391 entitled "Managing a Server Node Infrastructure", filed Sep. 12, 2012.
U.S. Appl. No. 13/674,770 entitled "Providing Multiple Level Process Intelligence and the Ability to Transition Between Levels", filed Nov. 12, 2012.
U.S. Appl. No. 13/733,563 entitled "Combining Odata and BPMN for a Business Process Visibility Resource Model", filed Jan. 3, 2013.

* cited by examiner

*Primary Examiner* — Wilbert L Starks
(74) *Attorney, Agent, or Firm* — Fish & Richardson P.C.

(57) ABSTRACT

The present disclosure involves systems, software, and computer-implemented methods for providing process intelligence by correlating events from multiple business process systems to a single business scenario using configurable correlation strategies. An example method includes identifying a raw event associated with a sending business process and a receiving business process, identifying a sending business process attribute associated with the sending business process and a receiving business process attribute associated with the receiving business process, determining a correlation strategy for associating the raw event with a business scenario instance, the determination based at least in part on the sending business process attribute and the receiving business process attribute, and generating a visibility scenario event from the raw event according to the correlation strategy, the visibility scenario event associated with the business scenario instance.

20 Claims, 5 Drawing Sheets

FIG. 4A

| PROCESS TYPE FOR OUTGOING COMMUNICATION (402) | PROCESS TYPE FOR INCOMING COMMUNICATION (404) | CORRELATION STRATEGY (406) | |
|---|---|---|---|
| TYPE A | TYPE A | PASSPORT ID ~430 | ←408 |
| TYPE B | TYPE B | INSTANCE ID | ←410 |
| TYPE A | TYPE B | EVENT ID + SEQUENCE ID ~431 | ←412 |

| PROCESS TYPE FOR OUTGOING COMMUNICATION (402) | PROCESS TYPE FOR INCOMING COMMUNICATION (404) | CORRELATION STRATEGY (PRIORITIZED) (406) | |
|---|---|---|---|
| TYPE C | TYPE C | 1. PASSPORT ID<br>2. INSTANCE ID ←432<br>3. EVENT ID | ←416 |
| TYPE D | TYPE D | 1. INSTANCE ID | ←418 |
| TYPE C | TYPE D | 1. EVENT ID + SEQUENCE ID<br>2. INSTANCE ID ~434 | ←420 |

| PROCESS TYPE FOR OUTGOING COMMUNICATION (402) | PROCESS TYPE FOR INCOMING COMMUNICATION (404) | CORRELATION STRATEGY (PRIORITIZED) (406) | |
|---|---|---|---|
| TYPE E | TYPE E | 1. <code fragment 1> ~436 | ←424 |
| TYPE F | TYPE F | 1. <code fragment 1><br>2. <code fragment 2> ~438 | ←426 |
| TYPE E | TYPE F | 1. EVENT ID + SEQUENCE ID<br>2. <code fragment 3> ~440 | ←428 |

422

US 9,037,525 B2

CORRELATING DATA FROM MULTIPLE BUSINESS PROCESSES TO A BUSINESS PROCESS SCENARIO

CROSS-REFERENCE TO CO-PENDING APPLICATION

This application is related to co-pending U.S. patent application Ser. No. 13/782,508 filed on Mar. 1, 2013, the entire contents of which are hereby incorporated by reference.

TECHNICAL FIELD

The present disclosure involves systems, software, and computer-implemented methods for providing process intelligence by correlating events from multiple business process systems to a single business scenario using various correlation strategies.

BACKGROUND

Process intelligence solutions generally allow analysts a particular view into data generated by running business process scenarios. Business process analysts may use this information to optimize a particular business process scenario. Data generated by different business process systems may be in different formats and include different identifiers. It can thus be difficult to identify data from the different business process systems that is associated with the particular business process scenario.

SUMMARY

The present disclosure involves systems, software, and computer-implemented methods for providing process intelligence by correlating events from multiple business process systems to a single business scenario using configurable correlation strategies. In one general aspect, an example method includes identifying a raw event associated with a sending business process and a receiving business process, identifying a sending business process attribute associated with the sending business process and a receiving business process attribute associated with the receiving business process, determining a correlation strategy for associating the raw event with a business scenario instance, the determination based at least in part on the sending business process attribute and the receiving business process attribute, and generating a visibility scenario event from the raw event according to the correlation strategy, the visibility scenario event associated with the business scenario instance.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIGS. 4A-C illustrate example data formats for an example correlation strategy table.

DETAILED DESCRIPTION

Figure 1:
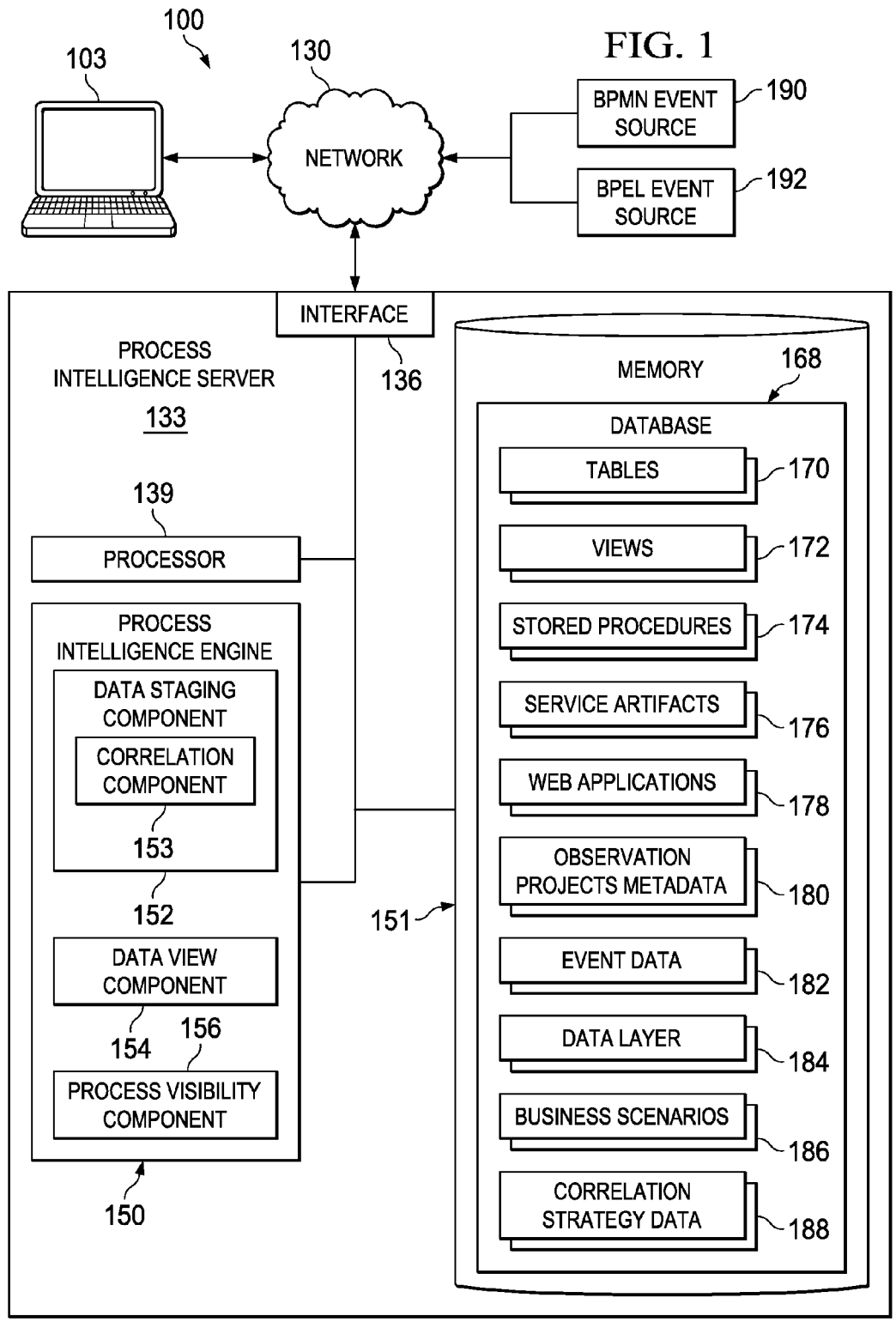
FIG. 1 is a block diagram illustrating an example system for storing a data set based on events generated by running business processes and correlating the events to business scenarios.

The present disclosure involves systems, software, and computer-implemented methods for providing process intelligence by correlating events from multiple business process systems to a single business scenario using various correlation strategies.

Process intelligence solutions allow users to observe the behavior of a business process scenario. The business process scenario may include running business processes from multiple different business process systems. For example, a business process scenario may include actions performed by multiple different systems including, but not limited to, Enterprise Resource Planning (ERP) systems, Customer Relationship Management (CRM) systems, Supply Chain Management (SCM) systems, Product Lifecycle Management (PLM) systems, Manufacturing Execution systems, message-oriented middleware systems, BPM/Workflow systems, Web and legacy applications, and other suitable systems. One such process intelligence solution is described in co-pending U.S. application Ser. No. 13/674,770, which is hereby incorporated by reference.

The process intelligence solution may provide users and other systems with views into the behavior of the business process scenario by analyzing flow events received from the multiple business process systems. Flow events indicate a specific transition from one state to another state and therefore describe a change in the lifecycle of a flow or flow step of a business process. For example, a flow event may be generated by a business process when the process starts, when the process terminates, when data is received, when a task completes, when an error occurs, or at any other suitable time. As business scenarios may span multiple different business process systems, a process intelligence solution may correlate flow events from different end-to-end process participants to a particular business scenario instance in order to provide a view of the behavior of the business scenario across the various systems. In some cases, however, there may not be a single correlation identifier that can be used across disparate business process systems.

The present disclosure describes a way of providing a configurable set of correlation strategies based on the type, capability or other attributes of the business system. The solution provides a set of correlation logic that is able to detect the type, capability or another attribute of the interacting business process participants and apply the correct strategy. In some cases, there may be a one-to-one mapping of a combination of the sending and receiving business process attributes to a correlation strategy. Multiple correlation strategies may also be mapped to a single combination of sending and receiving business process attributes. In some cases, the multiple correlation strategies may be associated with priorities, where the highest priority strategy determined to be appropriate for a particular flow event is used. The correlation strategies may also include code fragments to be executed by the system to correlate the flow event to a particular business scenario, such as, for example, by performing subsequent lookups or queries to perform the correlation. A fallback correlation strategy may also be configured and executed in cases where no appropriate correlation strategy can be identified. In some cases, this fallback correlation strategy may involve examining context fields associated with the flow event. A correlation failure notification may also be configured to notify a user or external system that an event could not be correlated, and instruct the user or system that additional configuration is necessary in order to correlate the event to a business scenario instance. In some instances, a flag or other identifier may be associated with the event, with a list of flagged or otherwise identified events kept for later review and/or manual correction.

FIG. 1 is a block diagram illustrating an example system 100 for providing process intelligence by allowing analysis of running business processes at multiple levels of detail. Specifically, the illustrated environment 100 includes or is communicably coupled with one or more clients 103, one or more event sources 190 and 192, and a network 130.

The example system 100 may include a process intelligence server 133. At a high level, the process intelligence server 133 comprises an electronic computing device operable to receive, transmit, process, store, or manage data and information associated with the environment 100. Specifically, the process intelligence server 133 illustrated in FIG. 1 is responsible for receiving, retrieving, or otherwise identifying events from various event sources, such as event sources 190 and 192, and processing those events to produce one or more views, allowing an analyst to investigate various properties and performance of one or more running business applications. In some cases, the process intelligence server 133 may receive requests from one or more clients 103. These requests may include requests for data from various layers, requests for transient data layers or views, and configuration requests related to the processing and generation of the various data layers.

As used in the present disclosure, the term "computer" is intended to encompass any suitable processing device. For example, although FIG. 1 illustrates a process intelligence server 133, environment 100 can be implemented using two or more servers, as well as computers other than servers, including a server pool. Indeed, process intelligence server 133 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated process intelligence server 133 may be adapted to execute any operating system, including Linux, UNIX, Windows, Mac OS®, Java™, Android™, iOS or any other suitable operating system. According to one implementation, process intelligence server 133 may also include or be communicably coupled with an e-mail server, a Web server, a caching server, a streaming data server, and/or other suitable server.

The process intelligence server 133 also includes an interface 136, a processor 139, and a memory 151. The interface 136 is used by the process intelligence server 133 for communicating with other systems in a distributed environment—including within the environment 100—connected to the network 130; for example, the client 103, as well as other systems communicably coupled to the network 130 (not illustrated). Generally, the interface 136 comprises logic encoded in software and/or hardware in a suitable combination and operable to communicate with the network 130. More specifically, the interface 136 may comprise software supporting one or more communication protocols associated with communications such that the network 130 or interface's hardware is operable to communicate physical signals within and outside of the illustrated environment 100.

As illustrated in FIG. 1, the process intelligence server 133 includes a processor 139. Although illustrated as a single processor 139 in FIG. 1, two or more processors may be used according to particular needs, desires, or particular implementations of environment 100. Each processor 139 may be a central processing unit (CPU), a blade, an application specific integrated circuit (ASIC), a field-programmable gate array (FPGA), or another suitable component. Generally, the processor 139 executes instructions and manipulates data to perform the operations of the process intelligence server 133. Specifically, the processor 139 may execute the functionality required to receive and respond to requests from the client 103, as well as to receive flow events from the event sources 190 and 192 and process these flow events to produce the various data layers required for the various views configured in the process intelligence server 133.

The illustrated process intelligence server 133 also includes a process intelligence engine 150. In some cases, the process intelligence engine 150 may produce and organize data for use in the process intelligence server 133. This may include receiving business process events from the event sources 190 and 192, storing those events in a data store (such as database 168), and processing the events to produce various layers corresponding to views of the running business processes. In some instances, the process intelligence engine 150 is implemented as a software application executing on the process intelligence server 133. In other instances, the process intelligence engine 150 is implemented as a collection of software applications executing on one or more process intelligence servers as part of a distributed system. In still other instances, the process intelligence engine 150 is implemented as a separate hardware and/or software component separate from the process intelligence server 133. The process intelligence engine 150 may include one or more different components, such as those described below. These components may be separate software libraries, separate software applications, separate threads, or separate dedicated hardware appliances. In some implementations, certain components may be omitted or combined or additional components may be added.

In the depicted implementation, the process intelligence engine 150 includes a data staging component 152, a data view component 154, and a process visibility component 156. In some instances, the data staging component 152 may be operable to receive business process events from the event sources 190 and 192 and perform processing on the events to interpolate, extract, and/or derive additional information from them based on the events themselves and/or configuration information relating to the event sources and the running business processes.

In some implementations, the data staging component 152 may be operable to transform events from a particular event source into a common format used by the process intelligence server 133. For example, events received from an event source in business process modeling notation (BPMN) format may be transformed into a normalized format before storage in database 168. Further, events received from an event source in a business process execution language (BPEL) format may be transformed into the same normalized format so that the correlation component 153 of process intelligence server 133 can operate on them in a common manner. This harmonization or normalization of events in different formats from various event sources may allow a unified view of a business process running across different business process systems.

In the depicted implementation, the data staging component 152 also includes a correlation component 153. The correlation component 153 may perform correlation of events from different systems or from different business process instances to produce a unified view of the activity of a business scenario. As discussed previously, a business scenario is a collection of one or more business process instances that execute and/or interact with each other. For example, a first process instance running on a first system may perform a task and then transfer control to a second process instance running on a second system. The correlation component 153 may correlate events generated by different processes and process instances in different systems to a single business scenario instance. By correlating the event data in this manner, the correlation component 153 may provide a view into the overall operation of a business process, rather than a view into only the portion of the process handled by a certain system. In some cases, this correlation is driven by configuration data, such as correlation strategy data 188 (discussed below). Therefore, correlation behavior for events between different process instances can be dynamically determined and updated by an analyst or by input from other systems.

In some cases, data staging component 152 may also perform more complex operations on the received event data. In some cases, the data staging component 152 may derive additional events beyond what is received from the event sources 190 and 192. For example, the data staging component 152 may derive, from the receipt of a "stop" event for a certain process instance, that a subsequent process instance responsible for the next task in a business scenario has started, and may thereby create a "start" event for that process instance. In another case, the data staging component 152 may filter out events from particular process instances that are determined not to be important. The data staging component 152 may determine which events are important by examining configuration data provided by an analyst or by an external system, such as, for example, the observation projects metadata 180. For example, an analyst may decide that informational status events produced by certain process instances do not contain any useful information about the given business scenario, and therefore may choose to configure the data staging component 152 to filter these events. In other cases, events may be filtered by many different criteria including, but not limited to, the source of the event, the type of the event, the process instance associated with the event, the task to which the event is associated, one or more actors associated with the event, or any other appropriate criteria.

In some implementations, the data staging component 152 may store the results of its operations in the database 168 or in some other data store. In other implementations, the data staging component 152 may perform its processing on-demand when a request for specific data is received. In other cases, the data staging component 152 stores the event data received from the event sources 190 and 192 in the database 168. In still other instances, another component is responsible for storing the received event data in the database 168 and the data staging component 152 accesses the event data for processing through the database 168.

Process intelligence engine 150 may also include a data view component 154. In some cases, the data view component 154 may produce various views into the stored data according to configuration information, such as the observation projects metadata 180, the views 172, or any other appropriate configuration data. The views 172 produced by the data view component 154 may be either transient (i.e., produced in response to a request) or persistent (i.e., pre-computed and stored). The data view component 154 may produce its view by operating on data output and/or stored by the data staging component 152, by operating directly on events received from the various event sources 190 and 192, or by a combination of methods.

The process intelligence engine 150 may further include a process visibility component 156 that provides an interface for configuration and control of the features of the process intelligence server 133. Specifically, the process visibility component 156 allows an analyst, an administrator, an external system, or other suitable user to configure the various views, data processing, data correlation, event derivation, and other features of the process intelligence server 133. In some implementations, this configuration is performed by creating, editing, updating, and/or deleting the observation projects metadata 180. The process visibility component 156 may include a web interface allowing a user to specify the observation projects metadata 180. The process visibility component 156 may also include an application programming interface (API) allowing external programs and systems to do the same. The process visibility component 156 may also be distributed on both the process intelligence server 133 and the one or more clients 103 as part of a client/server application.

The process visibility component 156 may further allow a user or external system to specify various business scenarios for analysis by the system. To this end, the process visibility component 156 may present a list of business process instances and allow selection and grouping of the instances into business scenarios representative of larger processes that span multiple instances and/or business process systems. By allowing the identification of these business scenarios, the process visibility component 156 allows the system to be configured to present complex views of the data that are not practical by manually examining data from one system in isolation.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The process intelligence server 133 also includes a memory 151, or multiple memories 151. The memory 151 may include any type of memory or database module and may take the form of volatile and/or non-volatile memory including, without limitation, magnetic media, optical media, random access memory (RAM), read-only memory (ROM), removable media, or any other suitable local or remote memory component. The memory 151 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the process intelligence server 133. Additionally, the memory 151 may include any other appropriate data, such as VPN applications, firmware logs and policies, firewall policies, a security or access log, print or other reporting files, as well as others.

As illustrated in FIG. 1, memory 151 includes or references data and information associated with and/or related to providing multiple process intelligence views related to running business applications. As illustrated, memory 151 includes a database 168. The database 168 may be one of or a combination of several commercially available database and non-database products. Acceptable products include, but are not limited to, SAP® HANA DB, SAP® MaxDB, Sybase® ASE, Oracle® databases, IBM® Informix® databases, DB2, MySQL, Microsoft SQL Server®, Ingres®, PostgreSQL, Teradata, Amazon SimpleDB, and Microsoft® Excel, as well as other suitable database and non-database products. Further, database 168 may be operable to process queries specified in any structured or other query language such as, for example, Structured Query Language (SQL).

Database 168 may include different data items related to providing different views of process intelligence data. The illustrated database 168 includes one or more tables 170, one or more views 172, one or more stored procedures 174, one or more service artifacts 176, one or more Web Applications 178, one or more observation projects metadata 180, a set of event data 182, one or more data layers 184, one or more business scenarios 186, and a set of correlation strategy data 188. In other implementations, the database 168 may contain any additional information necessary to support the particular implementation. In some implementations, the various illustrated components in the database 168 may be created by translating an existing business scenario definition, as described in co-pending application <INSERT APPLICATION NUMBER>, entitled "Translating Business Scenario Definitions Into Corresponding Database Artifacts", which is hereby incorporated by reference.

The tables 170 included in the illustrated database 168 may be database tables included as part of the schema of database 168. The tables 170 may also be temporary or transient tables created programmatically by requests from the clients 103 or from any other source. In some implementations, the structure of tables 170 may be specified by SQL statements indicating the format of the tables and the data types and constraints of the various columns. Further, the tables 170 may include any indexes necessary to allow for rapid access to individual rows of the tables. These indexes may be stored along with the tables 170, or may be stored separately in the database 168 or another system.

The views 172 included in the illustrated database 168 may be pre-computed or transient views into the data stored in the database 168. Generally, a view is query that is specified and stored in the database for quick retrieval. In some instances, the views will be specified in the same manner as standard database tables, with additional options for specifying whether the view is persistent (i.e., pre-computed and stored in the database) or transient (i.e., computed when a request for the view is received). In other implementations, the views 172 may be stored separately from the database as scripts or other programs operable to query the database 168 and present the data required by the view.

As illustrated, database 168 also includes stored procedures 174. Generally, a stored procedure is a sub-routine that is accessible to clients and programs that access a relational database. For example, a database might include a stored procedure called "max( )" that determines the maximum value in a returned series of integers, or a procedure called "sum( )" that produces a total when given a series of integers. Stored procedures might also be used to process data already stored in the database, or to process data as it is being inserted into the database. In some cases, the stored procedures 174 may be used to process the event data received from event sources 190 and 192 in order to produce one or more data layers representing the various views provided by the process intelligence server 133. In other cases, the stored procedures 174 may be used to generate any transient views provided in response to requests from clients by the process intelligence server 133.

Database 168 may also include service artifacts 176. In some implementations, the service artifacts 176 may include intermediate data formats used in processing the event data to produce the various layers. The data staging component 152 and the data view component 154 may produce various service artifacts as part of their processing. In some implementations, these service artifacts may include temporary or permanent database tables, views, files, or other data.

In illustrated FIG. 1, database 168 may include Web Applications 178. In some implementations, Web Applications 178 may include web applications for exposing data stored in the database 168 to external users and/or systems. The Web Applications 178 may be implemented in any appropriate technology such as, for example, HTML5, Javascript®, PHP, or any other technology or combination of technologies. In some instances, the Web Applications 178 are applications relating to access in-memory and other types of databases.

Illustrated database 168 may also include observation projects metadata 180. As discussed previously, observation projects metadata 180 may be used by the process intelligence engine 150 in staging and processing the event data received from the event sources, as well as providing views of the data at various levels. In some implementations, the observation projects metadata 180 is produced by the process visibility component 156 as a result of a user or external system specifying attributes of a business scenario to be observed.

Database 168 may also include event data 182. As discussed previously, event data 182 may be received, retrieved, identified, replicated, or otherwise obtained from the one or more event sources 190 and 192. In some instances, the event data 182 is stored in an unmodified format as it is received from event sources 190 and 192. This unmodified format may be referred to as raw event data. In some implementations, this raw event data is the basis for the staging, processing, correlation, and, ultimately, data view processing performed by the process intelligence engine 150. In other implementations, the system performs initial normalization or harmonization steps prior to inserting the event data 182 into the database 168, so the event data 182 is not truly raw. Such processing may include translation, filtering, derivation or any other suitable processing.

In some instances, the event data 182 can be used as the basis for deriving additional data layers 184. In such cases, the event data 182 is processed to produce one or more data layers containing data useful for analyzing the respective business scenarios identified to the system. In some cases, the data layers 184 may include references to the original event data 182 from which they were derived. For example, the event data 182 may include an event representing the start of a particular process instance. In such a case, the event may include a unique identifier, such as an event ID. A data layer 184 that is produced by processing the event data 182 may include an event corresponding to the original event from the event data 182. The new event may include additional derived or external information about the event, such as, for example, an identifier representing the business scenario associated with the event. In such cases, the new event in the data layer 184 may include the event ID of the original event. In this way, the data layer 184 may allow a user or external system to "drill down" to a lower layer in order to obtain a different view of a business process. Further, different layers in the one or more data layers may also build off one another in this same manner, such that a layer may contain a reference to the associated data at the layer from which it was derived. In some cases, including these references between the layers makes it possible for the system to transition between the different layers, allowing a user or analyst to view data representing the operation of the business scenario in many different ways from a single system.

Illustrated database 168 may also include business scenarios 186. In some cases, business scenarios 186 may define groups of business process instances that interact as part of a given business process. The business process instances may be executed on different business process systems, on the same business process system, or on a combination of the two. In some instances, the business scenarios 186 may also define particular events from different business process instances as important or relevant for additional analysis. In other instances, the business scenarios 186 may be defined by a user who manually identifies the different business process instances and/or events involved in a particular business scenario. In other cases, the business scenarios 186 may be defined automatically by a computer system by examining event data from the event sources 190 and 192, by executing according to rules defined by a user, or by any other appropriate mechanism or combination or mechanisms.

Illustrated database 168 may also include correlation strategy data 188. In some cases, the correlation strategy data 188 may define mechanisms for correlating received flow events (such as those included in event data 182) with particular business scenario instances (such as those included in business scenarios 186). The correlation strategy data 188 may be used by correlation component 153 to determine how to correlate a particular flow event to a business scenario instance. In some cases, the correlation strategy data 188 may include one or more database tables storing mappings from business process attributes to correlation strategies. In some cases, these correlation strategies may be a single identifier to be used for correlation (see, e.g., FIG. 4A). The correlation strategies may also include composite identifiers including multiple identifiers to be used for correlation. The correlation strategies may also be a prioritized list of correlation strategies (see, e.g., FIG. 4B). In such a case, the correlation component 153 may analyze each correlation strategy in light of the received flow event to determine if the strategy is appropriate. The correlation component 153 may also analyze each correlation strategy in the list and determine which of the correlation strategies is best suited to correlating the received flow event.

In some cases, the correlation strategies included in the correlation strategy data 188 may also include code fragments to be executed to correlate the received flow event. In some cases, these code fragments may be stored in a prioritized list and processed as described above. The code fragments may also be included in a prioritized list alongside other single and composite identifiers. In some cases, the code fragments define instructions to be executed by the correlation component 153 in order to correlate the received flow event. The code fragments may also be executed by other components of the process intelligence system 133 to perform correlation of the events. The code fragments may be instructions written in any suitable programming language including, but not limited to, PYTHON, SQL, C, C++, VISUAL BASIC, JAVA, PERL, JAVASCRIPT or PHP. The code fragments may also be pre-compiled executable programs that, when executed, perform the required correlation steps. The code fragments may also be directives specific to the correlation component 153 that instruct the correlation component 153 to perform pre-defined methods or operations to perform the required correlation.

The illustrated environment of FIG. 1 also includes a client 103, or multiple clients 103. Client(s) 103 may be any computing device operable to connect to or communicate with at least the process intelligence server 133 via the network 130 using a wireline or wireless connection. In general, client 103 comprises an electronic computer device operable to receive, transmit, process, and store any appropriate data associated with environment 100 of FIG. 1.

There may be any number of clients 103 associated with, or external to, environment 100. For example, while the illustrated environment 100 includes one client 103, alternative implementations of environment 100 may include multiple clients 103 communicably coupled to the process intelligence server 133 and/or the network 130, or any other number suitable to the purposes of environment 100. Additionally, there may also be one or more additional clients 103 external to the illustrated portion of environment 100 that are capable of interacting with the environment 100 via the network 130. Further, the term "client" and "user" may be used interchangeably as appropriate without departing from the scope of this disclosure. Moreover, while client 103 is described in terms of being used by a single user, this disclosure contemplates that many users may use one computer, or that one user may use multiple computers.

Illustrated client 103 is intended to encompass any computing device such as a desktop computer, laptop/notebook computer, wireless data port, smart phone, personal data assistant (PDA), tablet computing device, one or more processors within these devices, or any other suitable processing device. For example, client 103 may comprise a computer that includes an input device, such as a keypad, touch screen, or other device that can accept user information, and an output device that conveys information associated with the operation of the process intelligence server 133 or client 103 itself, including digital data, visual information, or a graphical user interface (GUI).

Example environment 100 may also include or be communicably coupled to one or more event sources 190 and 192. In some implementations, these event sources are business process platforms producing events representing various aspects of running business processes, such as, for example, state transitions, error conditions, informational messages, failure conditions, processes starting, process terminating, and other events and indications related to the running processes. The event sources 190 and 192 may provide a stream of these events to the process intelligence server 133 in the form of messages sent across network 130. In some implementations, these event messages are sent in real-time or pseudo real-time, while in other implementations the messages are cached by the event sources 190 and 192 and sent in large groups. In still other implementations, the process intelligence server 133 polls the event sources 190 and 192 requesting any new events and the event sources 190 and 192 respond with any events produced since the last poll. In another implementation, the event sources 190 and 192 communicate events by calling methods exposed through an API associated with process intelligence server 133. In still other cases, the process intelligence server 133 is integrated into the event sources 190 and 192. In some instances, the event sources 190 and 192 may insert events directly into database 168 or may communicate events from associated databases into database 168 through the use of replication protocols and/or methods.

The event sources 190 and 192 may produce business process events in different formats such as, for example, BPEL, BPMN, advanced business application programming (ABAP), or any other appropriate format or combination of formats. In some implementations, the event sources 190 and 192 will communicate the events to process intelligence server 133 in a normalized event format different from their native event formats by performing a translation prior to sending the event. In some instances, the process intelligence server 133 may access and/or retrieve event data directly or indirectly from the data sources 190 and 192.

Figure 2:
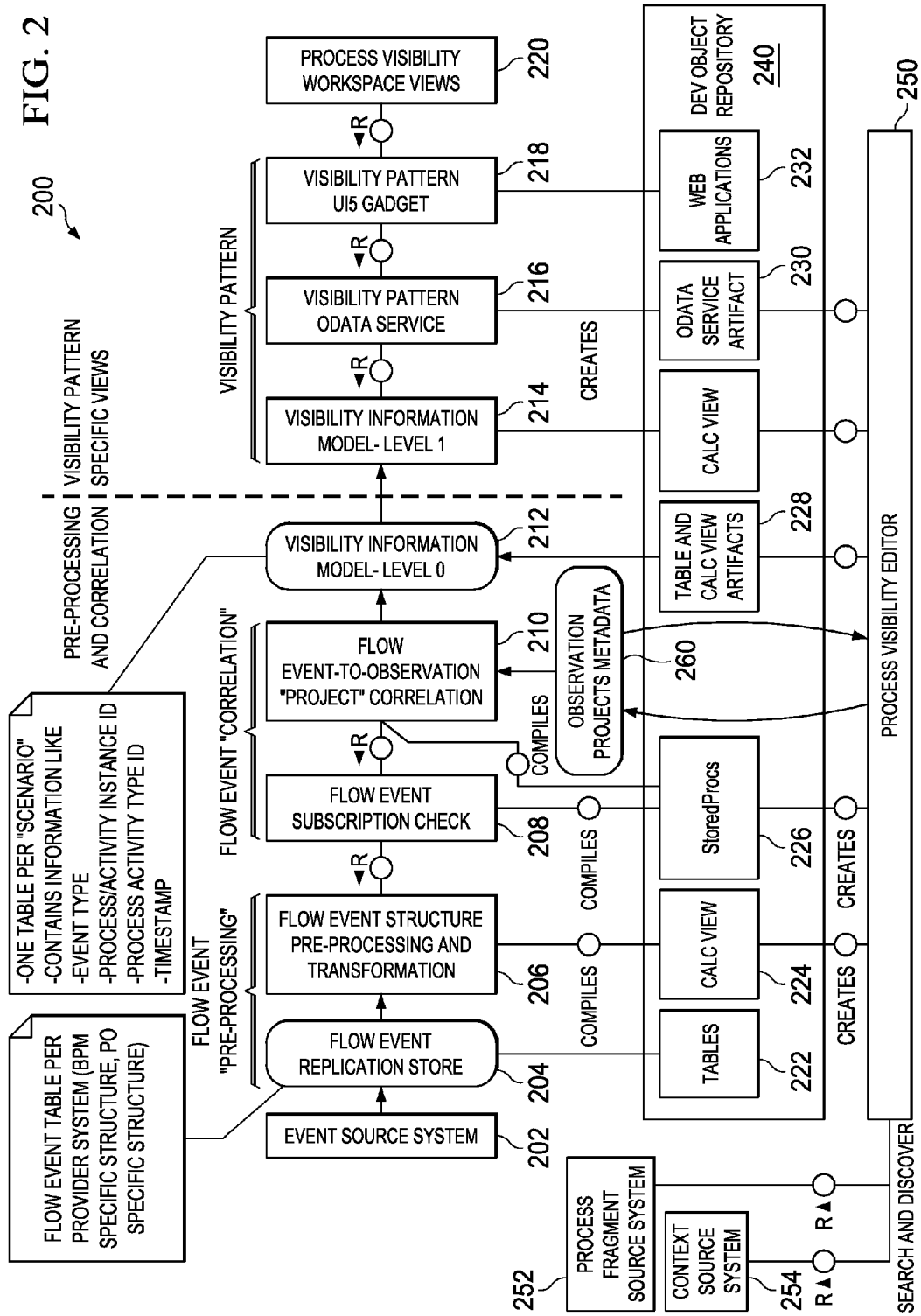
FIG. 2 is a block diagram illustrating an example system for processing events received from event sources to correlate the events to business scenarios.

FIG. 2 is a block diagram illustrating an example system 200 for processing events received from event sources 190 and 192 to produce the multi-layered data set. Generally, the illustrated system 200 is divided into two sections: pre-processing/correlation, and visibility. In some implementations, the example system 200 may include or be communicably coupled to a development object repository 240, and a process visibility editor 250.

The example system 200 may include or be communicably coupled to an event source system 202. In some implementations, the event source system 202 may be identical or similar to the event sources 190 and 192 discussed relative to FIG. 1, while in other implementations the event source system 202 may be different. As illustrated, the event source system 202 may be communicably coupled to a flow event replication store 204. The flow event replication store 204 may store events from the event source system 202 in a raw format, similar to event data 182 in FIG. 1. In other implementations, the flow event replication store 204 is a replicated table included in both the event source system 202 and the example system 200 that is kept synchronized by the database engines of the respective systems. The flow event replication store 204 may include one or more tables 222 which may be similar to or identical in structure to the tables 170 discussed relative to FIG. 1.

The illustrated system 200 also includes a flow event structure pre-processing and transformation component 206. In some cases, the flow event structure pre-processing and transformation component 206 may be communicably coupled to the flow event replication store 204. In some instances, the flow event structure pre-processing and transformation component 206 reads raw event data from the flow event replication store 204 and performs pre-processing and transformation procedures on the event data during the process of preparing one or more data layers from the raw event data. In some instances, the functionality of the flow event structure pre-processing and transformation component 206 includes or is similar to some aspect of the data staging component 152 discussed relative to FIG. 1, and may include normalizing or otherwise translating the raw event data stored in the flow event replication store 204 into a common format to be processed by other parts of the system. The flow event structure pre-processing and transformation component 206 may create one or more calc. views 224. In some implementations, these views may be identical or similar to the views 172 discussed relative to FIG. 1.

The illustrated system 200 may also include a flow event subscription check component 208 operable to determine whether a particular event is relevant or important to any particular business scenario. If an event is deemed not to be important, it may not be included in the subsequently produced data layer related to a particular business scenario. This filtering of events may occur according to the observation projects metadata 260 or according to any other specification of which events are important to a given business scenario.

The illustrated system 200 may also include a flow event-to-observation project correlation component 210 communicably or otherwise coupled to the flow event subscription check component 208. The flow event-to-observation project correlation component 210 may operate to correlate events from various business process instances into identified business scenarios. In some implementations, the flow event-to-observation project correlation component 210 performs this correlation in a manner similar to or identical to the correlation component 153 discussed relative to FIG. 1.

The illustrated system 200 may also include a first visibility information model 212 which may also be referred to as "Level 0." In some cases, Level 0 212 is a data layer as illustrated in FIG. 1. Level 0 212 may represent a view of business scenarios as defined by an analyst using a tool to interface with the system 200, such as the process visibility editor 250 (discussed below). In some implementations, Level 0 212 is a persistent data layer upon which other transient upper data layers are derived. In other cases, Level 0 212 is itself a transient layer produced on-demand in response to a received request for data. In some implementations, Level 0 212 is stored in a database, such as database 168 of FIG. 1. In some implementations, Level 0 212 may produce various tables and calc view artifacts 228 that represent various aspects of the first visibility information model 212.

The illustrated system 200 may also include a second visibility information model 214, which may also be referred to as "Level 1." In some cases, the Level 1 214 is a data layer, as illustrated in FIG. 1. In some implementations, Level 1 214 may be a transient data layer produced in response to a request for a specific data view. In other implementations, Level 1 214 may be a persistent data layer. In some implementations, Level 0 and Level 1 include references between one another to allow a user or analyst to "drill down" or "drill up" from one layer to another, as described relative to FIG. 1. Using these references, it may be possible for a user or analyst to access any data layer from any other data layer.

The illustrated system 200 also includes multiple process visibility workspace views 220. In some implementations, these views are visual representations of the data produced in the second visibility information model 214. The data may be presented to users or external systems through a graphical user interface (GUI) such as a web page. In other cases, the visibility workspace views 220 may be presented to users in the form of generated reports delivered to the user such as, for example, by email. In such instances, the reports may be in a format readable by standard desktop applications. Such formats may include Excel, Postscript, PDF, Word Doc, Access database, plain text, or any other suitable format or combination of formats.

The illustrated system 200 may also include a visibility pattern Odata service 216 and a visibility pattern UI5 gadget 218. In some implementations, these components may produce and present the process visibility workspace views 220 to the user. In other implementations, these components perform additional processing on the second visibility information model 214 before presenting the information contained therein to the requesting user.

The illustrated system 200 may also include or be communicably coupled to a process visibility editor 250. In some implementations, the process visibility editor 250 is a graphical or other interface that allows a user to identify and design the different data layers in order to allow the user to better view running business scenarios. In some implementations, this is accomplished by allowing the user to identify the different business process instances that are included in each business scenario, and by allowing the user to specify what data from a business scenario is important for them to see. For example, a user may identify a first event in a first process instance to be relevant to a certain business scenario, and identify a second event in a second instance as relevant to the same business scenario. In some implementations, the process fragment source system 252 provides information to the process visibility editor 250 regarding which process instances are available and/or currently running in a given business system or set of business systems. In other implementations, the context source system 254 provides information to the process visibility editor 250 regarding which process instances are related to which business scenarios.

The illustrated system 200 may also include stored procedures 226. In some cases, stored procedures 226 are similar or identical to the stored procedures 174 described relative to FIG. 1, while in other cases the stored procedures 226 may be configured specifically for the illustrated system 200. Illustrated system 200 may also include Odata service artifacts 230. In some cases, the Odata service artifacts 230 are similar or identical to the service artifacts 176 described in FIG. 1, while in other cases the Odata service artifacts 230 may be configured specifically for illustrated system 200. Illustrated system 200 may also include Web Applications 232. In some cases, Web Applications 232 are similar or identical to the Web Applications 178 described in FIG. 1, while in other cases the Web Applications 232 may be configured specifically for illustrated system 200.

Figure 3:
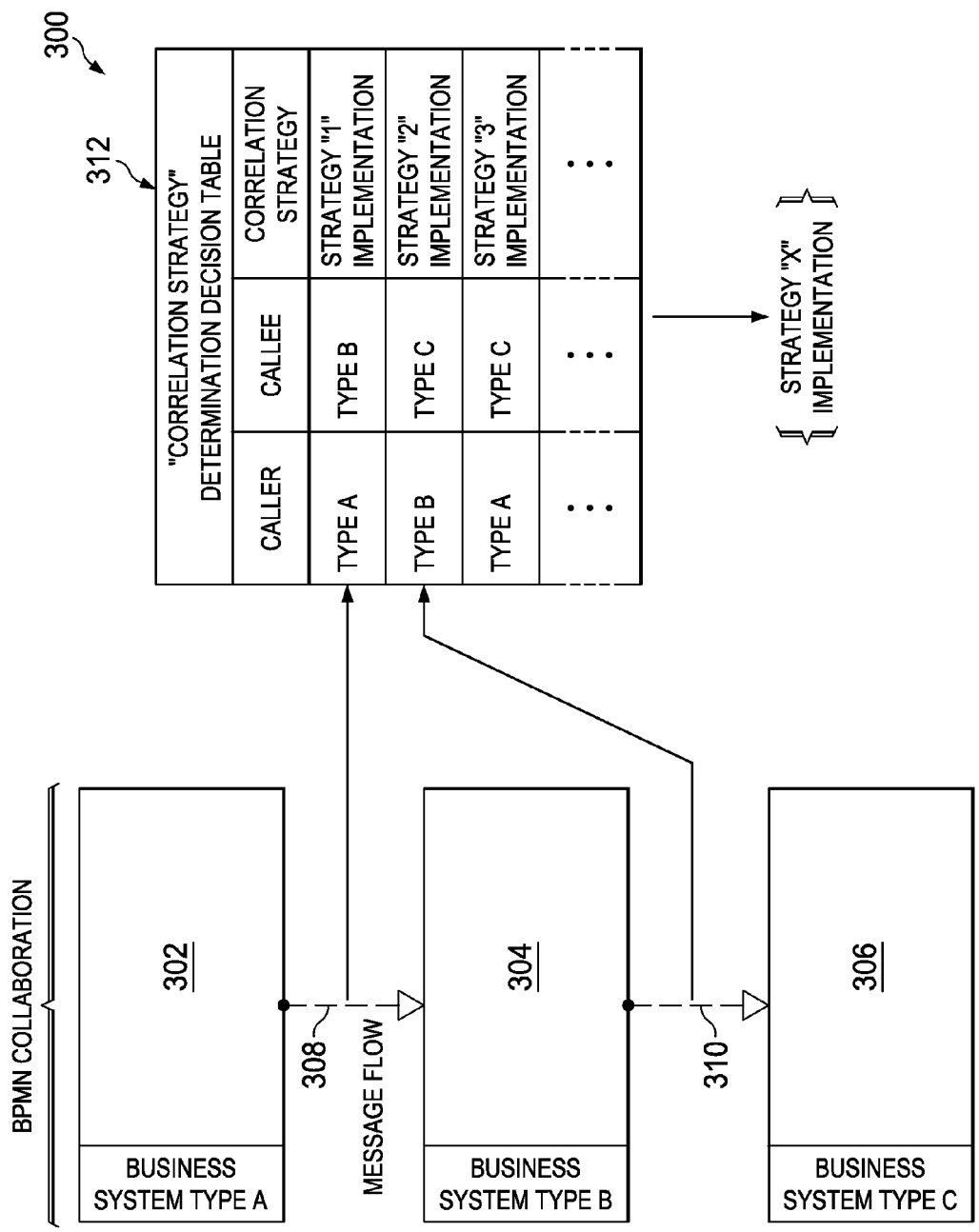
FIG. 3 is a block diagram illustrating an example system including multiple business systems and an associated correlation strategy table for correlating events from the business systems to a business scenario.

Referring to FIG. 3, a block diagram illustrating an example system 300 including multiple business systems and an associated correlation strategy table for correlating events from the business systems to a business scenario is illustrated. The system 300 includes three different business process systems 302, 304, and 306. In some cases, the business process systems 302, 304, and 306 may be different types of business process systems interacting to perform a business scenario. The business process systems 302, 304, and 306 may also have different capabilities, inputs, outputs, or any other suitable differentiating attribute or attributes. The business process systems 302, 304, and 306 may also be hosted on separate server systems, while in other cases the business process systems 302, 304, and 306 may be logical divisions within the same system (such as different business process instances).

The illustrated implementation also includes event 308 sent between business process system 302 and business process system 304. In some cases, the event 308 is an indication of an occurrence related to business process system 302, such as a business process instance starting or changing state. The event 308 may also be a message sent from business process system 302 to business process system 304 during the interaction of two business process instances. For example, a first business process instance associated with business process system 302 may send event 308 to a second business instance associated with business process system 304 to communicate information related to a specific business process scenario, such as information entered by a user, information for processing by the second business process system, or any other suitable information.

The illustrated implementation also includes event 310 sent between business process system 304 and business process system 306. Event 310 may be similar or identical to event 308 described above, except that it is sent between different business systems. Event 310 may be of the same type or of a different type than event 308. Although only two events are shown in the illustrated implementation, the present disclosure contemplates that several events may be passed between the business process systems and monitored. Further, events may be passed bi-directionally between the various business process systems instead of uni-directionally as shown in FIG. 3. Events may also be sent from any of the business process systems to any of the other business process systems, as well as to other systems not pictured in FIG. 3. Events may also be sent to other external systems and monitored by the present system.

The associated correlation strategy table 312 may be used to correlate the events 308 and 310 to a business scenario. The correlation strategy table 312 is operable to map the caller and callee types of an event to a particular correlation strategy. The caller and callee types correspond to the type of the business process system that sent the event and the type of business process system that received the event, respectively. Upon receipt of an event, a monitoring process may consult this correlation strategy table to determine a strategy for correlating the received event to a business process. This process will be described in greater detail with respect to FIG. 4A-C.

Referring to FIG. 4A, an example data format 400 is illustrated for an example correlation strategy table. The data format 400 may represent one or more tables within a relational, object-oriented or other database stored within a suitable database management system, including, but not limited to, SAP HANA DB, SAP MaxDB, Sybase ASE, Oracle databases, IBM Informix databases, DB2, MySQL, Microsoft SQL Server, Ingres, PostgreSQL, Teradata, or Amazon SimpleDB. The data format 400 may also represent a file in a file system, a resource on a server, rows within a spreadsheet, or any other logical or physical data format suitable for the purposes of the present disclosure. Data format 400 may include an outgoing process type column 402. In some cases, the outgoing process type column 402 may be replaced with a column storing capability, or any other suitable attribute of a business process. Data format 400 may also include an incoming process type column 404. In some cases, the incoming process type column 404 may be replaced with a column storing capability, or any other suitable attribute of a business process. In some cases, the outgoing process type column 402 and the incoming process type column 404 are used to identify a combination of process types to which a particular row in the correlation strategy table applies. For example, a row with an outgoing process type of "Type A" and an incoming process type of "Type B" would apply to events sent from a business process instance of type "Type A" to a business process instance of type "Type B."

Data format 400 may also include a correlation strategy column 406. The correlation strategy column 406 may store an indication of a correlation strategy for events matching the combination of incoming and outgoing types for the particular row in the table. The different values this column may hold and their meanings will be discussed below relative to the example data rows.

Data format 400 also includes three data rows 408, 410, and 412. These data rows are presented for exemplary purposes only, and are not intended to limit the scope of the present disclosure or to necessarily apply to any particular scenario. Data row 408 indicates that the identifier 430 "Passport ID" within the particular event should be used to correlate events sent from process instances of "Type A" to process instances of "Type A." Note that the incoming and outgoing process types in this example row are identical. This row applies to events sent within the same business process system, either between different process instances or inside the same process instance. Data row 410, similarly, indicates that the identifier "Instance ID" should be used to correlate events sent from process instances of "Type B" to process instances of "Type B."

Data row 412 indicates that the identifier "Event ID+Sequence ID" should be used to correlate events sent from process instances of "Type A" to process instances of "Type B." Identifier 431 is a composite identifier indicating that a combination of two identifiers (Event ID and Sequence ID) should be used to correlate events matching this data row. In some cases, composite identifiers may include three or more identifiers. Composite identifiers may also be identified using any appropriate notation in the data. In some cases, additional columns, rows, or tables may be provided to store each identifier in the composite identifier. The composite identifier may also be indicated by a particular format of text in the correlation strategy column 406, such as the "<identifier1>+<identifier2>" format shown in FIG. 4A or any other suitable format.

Referring to FIG. 4B, an example data format 414 is illustrated for an example correlation strategy table. Data format 414 also includes three data rows 416, 418, and 420. These data rows are presented for exemplary purposes only, and are not intended to limit the scope of the present disclosure or to necessarily apply to any particular scenario. Data row 416 indicates that an identifier from the identifier list 432 ("Passport ID, Instance ID, Event ID") within the particular event should be used to correlate events sent from process instances of "Type C" to process instances of "Type C." In some implementations, the identifier list 432 is a prioritized list of correlation identifiers. The identifier list 432 may be ordered from highest priority to lowest priority, or the priority may be explicitly modeled such as in another column or table. In some cases, a correlation process may analyze each identifier in the identifier list 432 to determine which of the identifiers is appropriate for a particular event. For example, a process may examine the first identifier in identifier list 432 ("Passport ID") and determine that it is appropriate for the particular event. In some cases, the process may use the first appropriate identifier for correlation, while in other cases the process may examine all identifiers in the list and use the highest priority identifier that is appropriate for the particular event. In some cases, whether the identifier is appropriate or not is determined by examining the particular event to determine if the event contains the configured identifier. The identifier may also be determined to be appropriate by other mechanisms, such as by consulting an external system, additional database tables, or any other suitable mechanism.

Data row 418 indicates that the single identifier "Instance ID" should be used for events from process instances of "Type D" to process instances of "Type D." Note that in some implementations, different types of identifiers (such as prioritized lists and single identifiers) may be contained within the correlation strategy column. In other cases, different rows, columns, or tables are used for storing the different types of identifiers. Data row 420 indicates that the identifier list 434 ("Event ID+Sequence ID, Instance ID") should be used for events from process instances of "Type C" to process instances of "Type D." The identifier list 434 includes a composite identifier ("Event ID+Sequence ID") and a single identifier ("Instance ID"). In some cases, the identifier list 434 may be processed as described above.

Referring to FIG. 4C, an example data format 422 is illustrated for an example correlation strategy table. Data format 422 also includes three data rows 424, 426, and 428. Data row 424 indicates that the code fragment 436 should be used for events from process instances of "Type E" to process instances of "Type E." In some instances, code fragment 436 may include executable code to correlate the particular event with a business process instance. The executable code of code fragment 436 may be executed by the system or process performing the correlation of the particular event (such as correlation component 153 from FIG. 1), an external system at the direction of the system or process performing the correlation, by the database or other system storing data row 424, or by any other suitable system. In some cases, code fragment 436 may include instructions in any suitable programming language including, but not limited to, PYTHON, SQL, C, C++, VISUAL BASIC, JAVA, PERL, JAVASCRIPT or PHP. The code fragment 436 may also be an object, data structure, application, script, applet, or any other form of software.

Data row 426 indicates that the code fragment list 438 ("<code fragment 1>, <code fragment 2>") should be used for events from process instances of "Type F" to process instances of "Type F." In some cases, code fragment list 438 may be organized and processed in a similar manner to identifier list 432, where a process may loop through the different fragments in the list and evaluate whether the fragment is appropriate for correlating the particular event. Data row 428 indicates that the hybrid list 440 ("Event ID+Sequence ID, <code fragment 2>") should be used for events from process instances of "Type E" to process instances of "Type F." In some cases, hybrid list 438 may be organized and processed in a similar manner to identifier list 432, where a process may loop through the different items in the list and evaluate whether the identifier or code fragment is appropriate for correlating the particular event.

Figure 5:
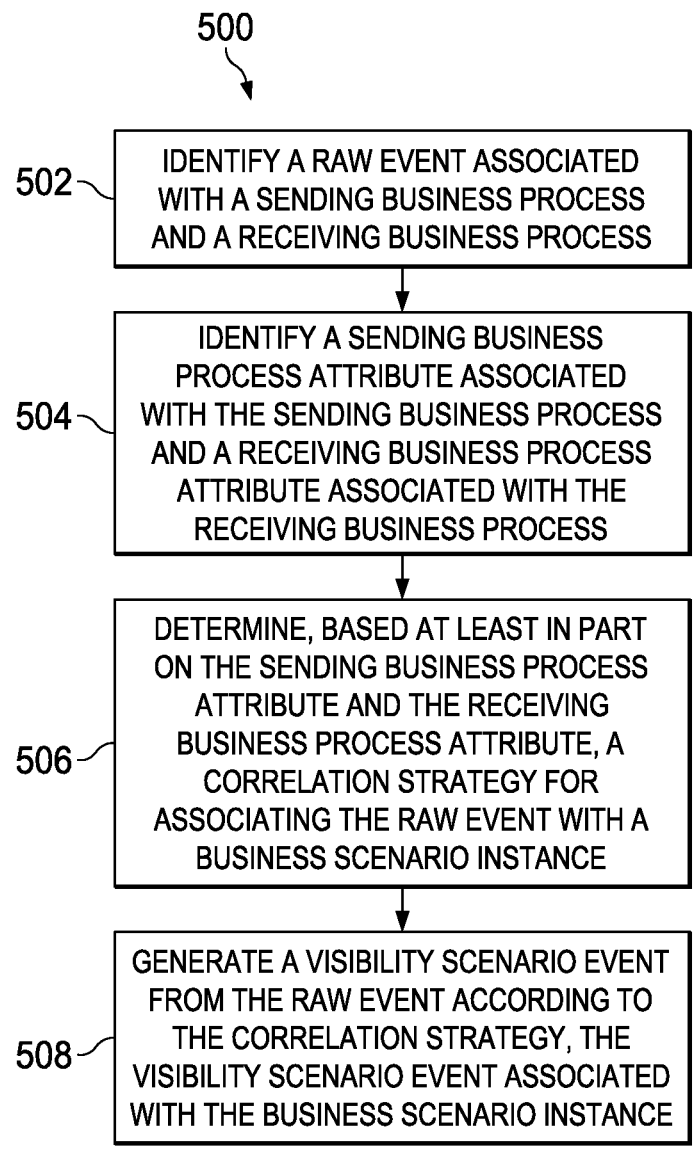
FIG. 5 is a flowchart of an example method for correlating business process event data with a business scenario.

Referring to FIG. 5, a flowchart of an example method 500 for correlating business process event data with a business scenario is shown. At 502, a raw event associated with a sending business process and a receiving business process is identified. In some cases, the raw event may be received from a business process system over a network. The raw event may also be identified by querying a database table containing events. In some cases, the raw event may be in a format associated with the particular business process system in which it is generated. The raw event may also have been reformatted or normalized for processing by a monitoring system.

In some cases, the raw event will be associated with the sending and receiving business processes by an identifier included in the raw event itself. The raw event may also be associated with the sending and receiving business processes by querying an external system using information included in the raw event.

At 504, a sending business process attribute associated with the sending business process and a receiving business process attribute associated with the receiving business process are identified. In some cases, the sending and receiving business process attributes are included within or associated with the raw event. The sending and receiving business process attributes may also be identified by querying an external source to retrieve attributes associated with the sending and receiving business process.

At 506, a correlation strategy for associating the raw event with a business scenario instance is determined based at least in part on the sending business process attribute and the receiving business process attribute. In some cases, the correlation strategy is determined by performing a database querying into a table associating the combination of sending and receiving business process attributes with a correlation strategy or list of correlation strategies, as described relative to FIGS. 4A-C. The correlation strategy may also include multiple distinct correlation strategies organized into a prioritized list and associated with the sending and receiving business process attributes. These correlation strategies may include single identifiers, composite identifiers, code fragments, macros, or any other form of software instructions or identifiers.

At 508, a visibility scenario event is generated from the raw event according to the correlation strategy, the visibility scenario event associated with the business scenario instance. In some instances, the visibility scenario event may be a new row in a database including some or all of the information from the raw event and one or more identifiers to correlate the visibility scenario event to a business scenario instance. In some cases, the information to correlate the visibility scenario event to the business scenario instance may correspond to the correlation strategy determined at 506. After correlation, the visibility scenario event may be used to generate various views of the business scenario instance. For example, correlated visibility scenario events may be used to provide a visual representation of the operation of the business scenario instance by showing all or some of the events that have been correlated to the business scenario instance. In some cases, the correlated visibility scenario events may be used to show one or more views of the operation of the business scenario instance. For example, different views may be customized according to different types of analysis to provide different levels of detail.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
   identifying a raw event associated with a sending business process and a receiving business process;
   identifying a sending business process attribute associated with the sending business process and a receiving business process attribute associated with the receiving business process;
   determining a correlation strategy for associating the raw event with a business scenario instance, the determination based at least in part on the sending business process attribute and the receiving business process attribute; and
   generating a visibility scenario event from the raw event according to the correlation strategy, the visibility scenario event associated with the business scenario instance.

2. The computer-implemented method of claim 1, wherein the sending business process attribute and the receiving business process attribute each include at least one of a process type and a capability.

3. The computer-implemented method of claim 1, wherein the correlation strategy includes an identifier used to associate the raw event with the business scenario instance, and wherein the generated visibility scenario event includes the identifier.

4. The computer-implemented method of claim 1, wherein determining the correlation strategy includes:
   identifying a list of one or more combinations of at least one sending business process attribute and at least one receiving business process attribute, each combination associated with at least one correlation strategy.

5. The computer-implemented method of claim 4, wherein at least one of the combinations are associated with two or more correlation strategies, each of the two or more correlation strategies associated with a priority.

6. The computer-implemented method of claim 5, comprising:
   for each combination of the one or more combinations:
      determining whether the combination matches the sending business process attribute and the receiving business process attribute associated with the raw event; and
      if the combination matches, determining the highest priority that is appropriate for correlating the raw event from the two or more correlation strategies.

7. The computer-implemented method of claim 6, comprising:
   generating the visibility scenario event from the raw event according to a fallback correlation strategy when none of the correlation strategies from the two or more correlation strategies are determined to be appropriate.

8. The computer-implemented method of claim 1, wherein the correlation strategy includes instructions operable to communicate with an external system to correlate the raw event.

9. The computer-implemented method of claim 1, comprising presenting an indication that more configuration is necessary when a correlation strategy cannot be determined for the raw event.

10. The computer-implemented method of claim 1, wherein the correlation strategy includes a code fragment to be executed to correlate the raw event with the business scenario instance.

11. A computer program product encoded on a tangible, non-transitory storage medium, the product comprising computer readable instructions for causing one or more processors to perform operations comprising:
   identifying a raw event associated with a sending business process and a receiving business process;
   identifying a sending business process attribute associated with the sending business process and a receiving business process attribute associated with the receiving business process;
   determining a correlation strategy for associating the raw event with a business scenario instance, the determination based at least in part on the sending business process attribute and the receiving business process attribute; and
   generating a visibility scenario event from the raw event according to the correlation strategy, the visibility scenario event associated with the business scenario instance.

12. The computer program product of claim 11, wherein the sending business process attribute and the receiving business process attribute each include at least one of a process type and a capability.

13. The computer program product of claim 11, wherein the correlation strategy includes an identifier used to associate the raw event with the business scenario instance, and wherein the generated visibility scenario event includes the identifier.

14. The computer program product of claim 11, wherein determining the correlation strategy includes:
identifying a list of one or more combinations of at least one sending business process attribute and at least one receiving business process attribute, each combination associated with at least one correlation strategy.

15. The computer program product of claim 14, wherein at least one of the combinations are associated with two or more correlation strategies, each of the two or more correlation strategies associated with a priority.

16. The computer program product of claim 11, comprising computer readable instructions for causing one or more processors to perform operations comprising:
for each combination of the one or more combinations:
determining whether the combination matches the sending business process attribute and the receiving business process attribute associated with the raw event; and
if the combination matches, determining the highest priority that is appropriate for correlating the raw event from the two or more correlation strategies.

17. The computer program product of claim 16, comprising computer readable instructions for causing one or more processors to perform operations comprising:
generating the visibility scenario event from the raw event according to a fallback correlation strategy when none of the correlation strategies from the two or more correlation strategies are determined to be appropriate.

18. The computer program product of claim 11, wherein the correlation strategy includes instructions operable to communicate with an external system to correlate the raw event.

19. The computer program product of claim 11, comprising presenting an indication that more configuration is necessary when a correlation strategy cannot be determined for the raw event.

20. A system, comprising:
memory for storing data; and
one or more processors operable to:
identify a raw event associated with a sending business process and a receiving business process;
identify a sending business process attribute associated with the sending business process and a receiving business process attribute associated with the receiving business process;
determine a correlation strategy for associating the raw event with a business scenario instance, the determination based at least in part on the sending business process attribute and the receiving business process attribute; and
generate a visibility scenario event from the raw event according to the correlation strategy, the visibility scenario event associated with the business scenario instance.

* * * * *